United States Patent [19]
Tsuda et al.

[11] Patent Number: 5,350,555
[45] Date of Patent: Sep. 27, 1994

[54] PROCESS FOR TWO STAGE INJECTION MOLDING OF AIR-CONDITIONING BLOW-OUT PORT DEVICE

[75] Inventors: Kazuhiko Tsuda; Kazuhiro Hashimoto, both of Kawagoe, Japan

[73] Assignee: Moriroku Kabushiki Kaisha, Tokyo, Japan

[21] Appl. No.: 62,839

[22] Filed: May 18, 1993

[30] Foreign Application Priority Data

Dec. 1, 1992 [JP] Japan .................................. 4-321959

[51] Int. Cl.$^5$ .......................... B32B 1/00; B32B 3/00; B32B 7/04
[52] U.S. Cl. .................................... 264/242; 264/264; 425/DIG. 34
[58] Field of Search ............................. 264/242, 264; 425/DIG. 34

[56] References Cited

U.S. PATENT DOCUMENTS 4,414,170  11/1983  Sano ................... 264/242
4,702,156  10/1987  Sano ................. 264/242 X

FOREIGN PATENT DOCUMENTS 2627346  12/1976  Fed. Rep. of Germany ...... 264/242
1554635  10/1979  Japan .

Primary Examiner—Karen Aftergut
Attorney, Agent, or Firm—Armstrong, Westerman, Hattori, McLeland & Naughton

[57] ABSTRACT

In producing a blow-out port device in a two-stage injection molding process by use of synthetic resin, the blow-out port device having a housing including pairs of shaft bores and pairs of circular section bosses both provided in and on opposed wall portion of a peripheral wall of the housing, and a plurality of blades each including a pair of protruding portions provided at opposite ends of each of blade bodies disposed within the housing to abut against a pair of boss and to have the same outside diameter as the boss, and a pair of support shafts projectingly provided on end faces of the protruding portions and turnably fitted in the shaft bores, the housing is forced at a primary injection step, and then, the blades are formed at a secondary injection step by use of the shaft bores in the housing as support shaft-forming cavities. Thus, it is possible to provide an air-conditioning blow-out port device having an improved appearance around a mounting portion of each blade.

3 Claims, 19 Drawing Sheets

PROCESS FOR TWO STAGE INJECTION MOLDING OF AIR-CONDITIONING BLOW-OUT PORT DEVICE

BACKGROUND OF THE INVENTION

1. Field of the Invention

The present invention relates to a process for two-stage injection molding of an air-conditioning blow-out port device mounted in an instrument panel or the like in an automobile.

2. Description of the Prior Art

There is such a conventionally known blow-out port device comprising a housing which includes pairs of shaft bores provided in a coaxial arrangement in opposed wall portions of a peripheral wall thereof, and pairs of bosses also provided at the opposed wall portions to define openings of the shaft bores inside the opposed wall portions, respectively, and a plurality of blades which each includes a pair of abutment flanges abutting against a pair of the bosses, and a pair of support shafts projectingly provided on surfaces of the abutment flanges and rotatably fitted in the shaft bores. This blow-out port device is produced by a two-stage injection molding process which comprises forming the housing at a primary injection step using synthetic resin and forming the blades by use of the shaft bores as support shaft forming cavities at a secondary injection step.

With the above prior art process, however, a problem is encountered that the bosses of the housing and the abutment flanges of the blades are failed to be formed into a circular section configuration, because the axes of the support shafts are offset from matched surfaces of opening/closing dies. Consequently, if the blades of the blow-out port device produced in the above process is turned in order to adjust the direction of wind, each of the bosses and each of the abutmerit flanges may be offset from each other, in some cases, and a portion of the abutment flange may protrude from the boss, resulting in an inferior appearance.

Thereupon, if the air-conditioning blow-out port device is constructed of a housing which includes pairs of shaft bores provided in a coaxial arrangement in opposed wall portions of a peripheral wall thereof to extend through the opposed wall portions, and pairs of circular-section bosses located coaxially with the shaft bores to define openings of the shaft bores inside the opposed wall portions, respectively, and a plurality of blades which each include a pair of protruding portions abutting against a pair of the bosses and each having the same outside diameter as the boss, and a pair of support shafts projectingly provided coaxially on end faces of the protruding portions and turnably fitted in the shaft bores, respectively, it is possible to overcome the above problem to provide an improved appearance around a mounting portion of each of the blades, because each of the protruding portions and each of the bosses cannot be offset from each other, even if the blades are turned.

SUMMARY OF THE INVENTION

Accordingly, it is an object of the present invention to provide a two-stage injection molding process of the above-described type, which is capable of mass production of an air-conditioning blow-out port device of the above-described type at a reduced cost.

To achieve the above object, according to claim 1, there is provided a process for two-stage injection molding of an air-conditioning blow-out port device by use of synthetic resin, the blow-out port device comprising: a housing which includes pairs of shaft bores provided in a coaxial arrangement in opposed wall portions of a peripheral wall of the housing to extend through the opposed wall portions, and pairs of circular-section bosses located coaxially with the shaft bores to define openings of the shaft bores at inner surfaces of the opposed wall portions, respectively; and a plurality of blades each including a pair of protruding portions having the same outside diameter as the outside diameter of the boss and provided at opposite ends of a blade body disposed within the housing to abut against a pair of the bosses, and a pair of support shafts projectingly provided coaxially on end faces of the protruding portions and turnably fitted in the shaft bores, respectively; wherein the process comprising the steps of: closing opposed first and second opening/closing dies to clamp a plurality of first opposed slide dies each including a plurality of shaft bore forming cores between both the opening/closing dies, thereby defining a first cavity for forming the peripheral wall of the housing so as to include base ends of the shaft bore forming cores with their axes aligned with matched surfaces of the opening/closing dies, while fitting a plurality of semi-circular section dammed projections projectingly provided on the matched surface of the second opening/closing die into protruding portion-corresponding areas of a plurality of first semi-circular section recesses opened into the matched surface of the first opening/closing die and commonly used for forming halves of adjacent bosses and protruding portions, thereby defining a plurality of second cavities for forming the bosses around tip ends of the shaft bore forming cores abutting against end faces of the dammed projections by cooperation of the boss-corresponding areas of the first recesses with a plurality of semi-circular section recesses opened into the matched surface of the second opening/closing die; primarily injecting a synthetic resin into the first and second cavities to form the housing; withdrawing the shaft bore forming cores of the first slide bores out of the respective shaft bores, and then, opening the first and second opening/closing dies, with the housing left attached to the first opening/closing die; closing the first opening/closing die and a third opening/closing die with the former die opposed to the latter die, thereby clamping the peripheral wall of the housing between both the first and third opening/closing dies, while clamping the bosses between the boss-corresponding areas of the first recesses of the first opening/closing die and a plurality of second semi-circular recesses opened into the matched surface of the third opening/closing die and opposed to the first recesses, and defining a plurality of third cavities for forming the protruding portion between the protruding portion-corresponding areas of the first and second recesses, defining a plurality of fourth cavities for forming the blade body between both the opposed third cavities; and using the shaft bores in the housing as fifth cavities for forming the support shafts and secondarily injecting the synthetic resin into the third, fourth and fifth cavities to form the blades.

With the above process, it is possible to form the circular-section bosses and the circular-section protruding portions having the same outside diameter as the bosses and coaxially abutting against the bosses, thereby enabling the mass production of the air-conditioning blow-out device having an improved appearance around the abutment portions of the blade at a reduced cost.

In addition, according to the present invention, there is provided a process for two-stage injection molding of an air-conditioning blow-out port device by use of synthetic resin, the blow-out port device comprising: a housing which includes opposed wall portions and pairs of shaft bores provided in a coaxial arrangement to extend through the opposed wall portions; and a plurality of blades each including a pair of circular-section protruding portions provided at opposite ends of each of blade bodies disposed within the housing to abut against the opposed wall portions, and a pair of support shafts projectingly provided coaxially on end faces of the protruding portions and turnably fitted in the shaft bores, respectively; wherein the process comprising the steps of: closing opposed first and second opening/closing dies to clamp a plurality of first opposed slide dies each including a plurality of shaft bore forming cores between both the first and second opening/closing dies, thereby defining a first cavity for forming the housing so as to include the shaft bore forming cores with their axes aligned with matched surfaces of the opening/closing dies, while fitting a plurality of semi-circular section dammed projections projectingly provided on the matched surface of the second opening/closing die into a plurality of first semi-circular section recesses opened into the matched surface of the first opening/closing die and commonly used for forming halves of the protruding portions; primarily injecting a synthetic resin into the first cavity to form the housing; withdrawing the shaft bore forming cores of the first slide bores out of the respective shaft bores, and then, opening the first and second opening/closing dies, with the housing left attached to the first opening/closing die, closing the first opening/closing die and a third opening/closing die with the former die opposed to the latter die, thereby clamping the housing between both the first and third opening/closing dies, while defining a plurality of second cavities for forming the protruding portion between the first recesses of the first opening/closing die and a plurality of second semi-circular section recesses opened into the matched surface of the third opening/closing die and opposed to the first recesses, and further, defining a plurality of third cavities for forming the blade body between both the opposed second cavities; and using the shaft bores in the housing as fourth cavities for forming the support shafts and secondarily injecting the synthetic resin into the second, third and fourth cavities to form the blades.

With the above process, it is possible to form the protruding portions into a circular section configuration, thereby enabling the mass production of the air-conditioning blow-out device having an improved appearance around the abutment portions of the blade at a reduced cost.

Further, according to the present invention, there is provided a process for two-stage injection molding of an air-conditioning blow-out port device by use of synthetic resin, the blow-out port device comprising: a housing which includes a peripheral wall having pairs of shaft bores coaxially arranged in opposed wall portions of the peripheral wall to extend through the opposed wall portions, and pairs of circular-section bosses provided in the peripheral wall coaxially with the shaft bores to define openings of the shaft bores at inner surfaces of the opposed wall portions, respectively; and a plurality of blades each including a blade body disposed within the housing with a front edge of the blade body located adjacent a front surface of the housing being formed to have the same radius as that of the boss and with opposite end faces of the blade body abutting against a pair of the bosses, and a pair of support shafts projectingly provided coaxially on opposite end faces of the blade body and turnably fitted in the shaft bores, respectively; wherein the process comprising the steps of: closing opposed first and second opening/closing dies to clamp a plurality of first opposed slide dies each including a plurality of shaft bore forming cores between both the opening/closing dies, thereby defining a first cavity for forming the peripheral wall of the housing so as to include base ends of the shaft bore forming cores with their axes aligned with matched surfaces of the opening/closing dies, while fitting a plurality of semi-circular section dammed projections projectingly provided on the matched surface of the second opening/closing die into protruding portion-corresponding areas of a plurality of first semi-circular section recesses opened into the matched surface of the first opening/closing die and commonly used for forming halves of adjacent bosses and front edges, thereby defining a plurality of second cavities for forming the bosses around tip ends of the shaft bore forming cores abutting against end faces of the dammed projections by cooperation of the boss-corresponding areas of the first recesses with a plurality of semi-circular section recesses opened into the matched surface of the second opening/closing die; primarily injecting a synthetic resin into the first and second cavities to form the housing; withdrawing the shaft bore forming cores of the first slide bores out of the respective shaft bores, and then, opening the first and second opening/closing dies, with the housing left attached to the first opening/closing die; closing the first opening/closing die and a third opening/closing die with the former die opposed to the latter die, thereby clamping the peripheral wall of the housing between both the first and third opening/closing dies, while clamping the bosses between the boss-corresponding areas of the first recesses of the first opening/closing die and a plurality of second semi-circular recesses opened into the matched surface of the third opening/closing die and opposed to the first recesses, and defining a plurality of third cavities for forming the blade bodies between the opposed bosses; and using the shaft bores in the housing as fourth cavities for forming the support shafts and secondarily injecting the synthetic resin into the third and fourth cavities to form the blades.

With the above process, it is possible to form the opposite ends of the blade body so that it has the same radius as the radius of the boss, thereby enabling the mass production of the air-conditioning blow-out device having an improved appearance around the abutment portions of the blade at a reduced cost.

The above and other objects, features and advantages of the invention will become apparent from the following description of preferred embodiments, taken in conjunction with the accompanying drawings.

DESCRIPTION OF THE PREFERRED EMBODIMENTS

Figure 1:
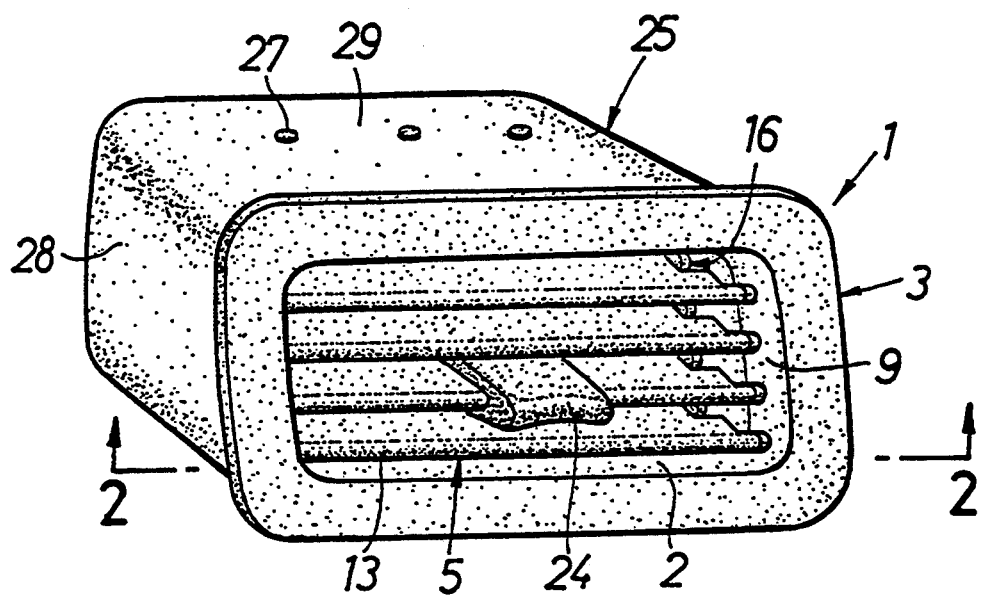
FIG. 1 is a perspective view illustrating one example of an air-conditioning blow-out port device.
Figure 2:
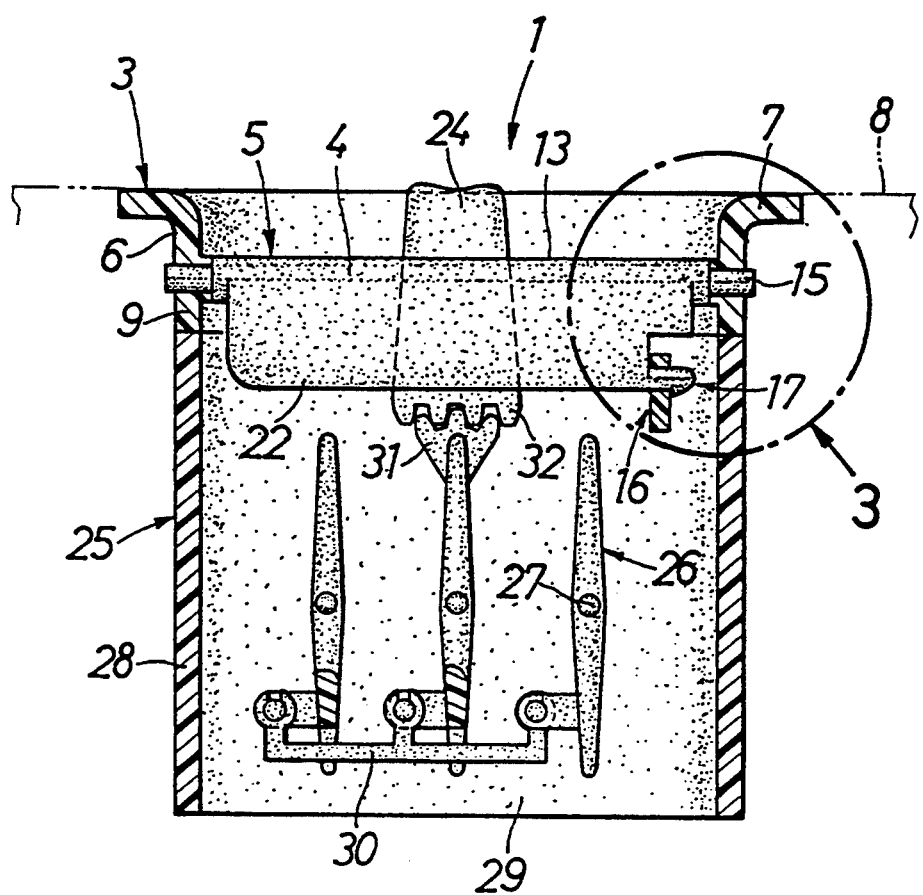
FIG. 2 is a sectional view taken along a line 2—2 in FIG. 1.

FIGS. 1 to 5 illustrate one example of an air-conditioning blow-out port device 1. As best shown in FIGS. 1 and 2, this device 1 is comprised of a housing 3 of synthetic resin having a substantially rectangular blow-out port 2, and a plurality of blades 5 of synthetic resin having blade bodies 4 disposed within the housing 3 for adjusting the vertical direction of wind. The housing 3 has a front flange 7 at a front end of a peripheral wall 6 thereof and is adapted to be embedded into an instrument panel 8 of an automobile with a front surface of the front flange 7 being aligned with a surface of the instrument panel 8.

Figure 3:
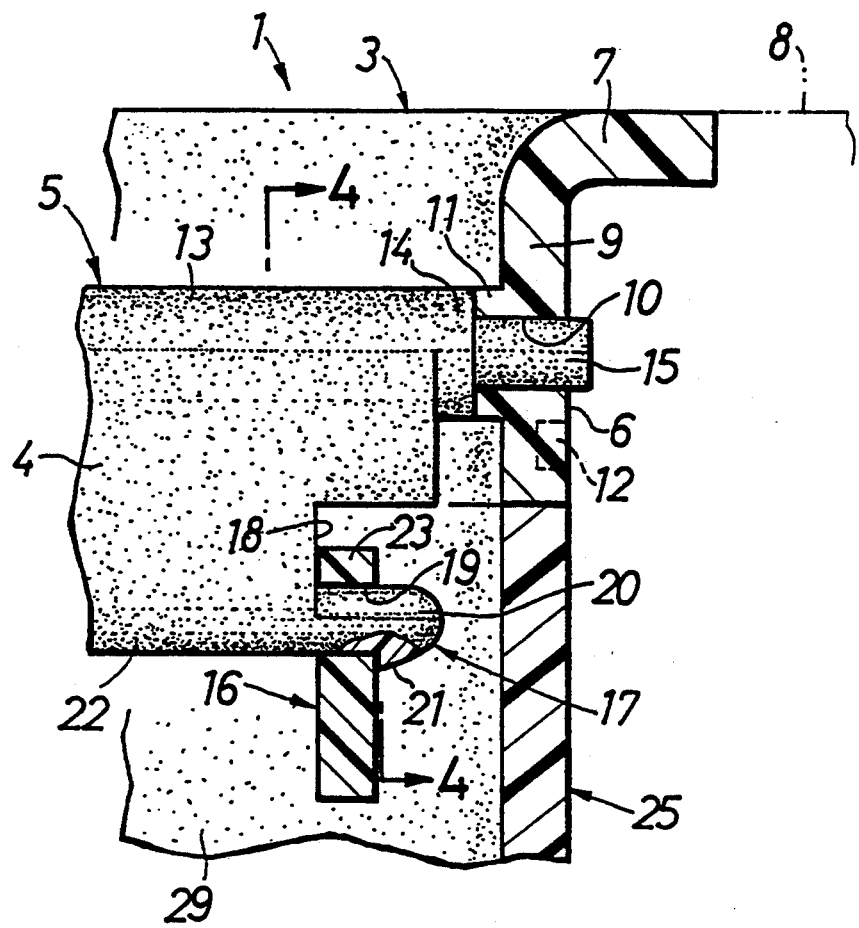
FIG. 3 is an enlarged view taken along an arrow 3 in FIG. 2.
Figure 4:
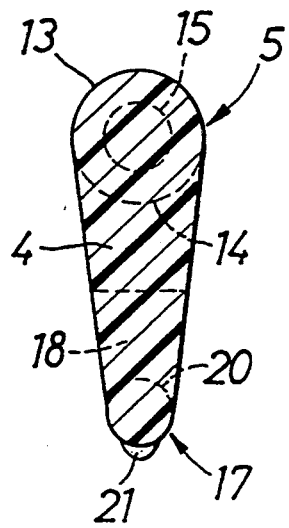
FIG. 4 is a sectional view taken along a line 4—4 in FIG. 3.

As best shown in FIGS. 2 and 3, the peripheral wall 6 of the housing 3 is provided, at left and right opposed wall portions 9 thereof, with pairs of shaft bores 10 arranged coaxially to extend through the opposed wall portions 9, and pairs of circular-section bosses 11 located coaxially with corresponding one of the shaft bores 10 to define an opening of the shaft bore 10 inside the opposed wall portion 9. Recesses 12 are opened into outer surfaces of the opposed wall portions 9 and are used at a step of releasing of the device 1 from a molding apparatus.

Each of the blades 5 is provided, at a front edge 13 of the blade body 4, with a pair of protruding portions 14 abutting against the pair of bosses 11 and having the same diameter as the bosses 11, and a pair of support shafts 15 which are projectingly provided coaxially on end faces of the protruding portions 14 and turnably fitted in the shaft bores 10, respectively. A front edge 13 of the blade body 4 is formed to have the same diameter as the protruding portion 14, as clearly shown in FIG. 4, whereby the front edge 13 is continuous with the protruding portions 14 with no step created therebetween.

If an area of each blade 5 around its mounting portion is constructed in the above manner, even if each blade 5 is turned to any wind direction-adjusted position, each protruding portion 14 and each boss 11 cannot be offset from each other and therefore, the appearance of the area around the mounting portion can be improved.

Figure 5:
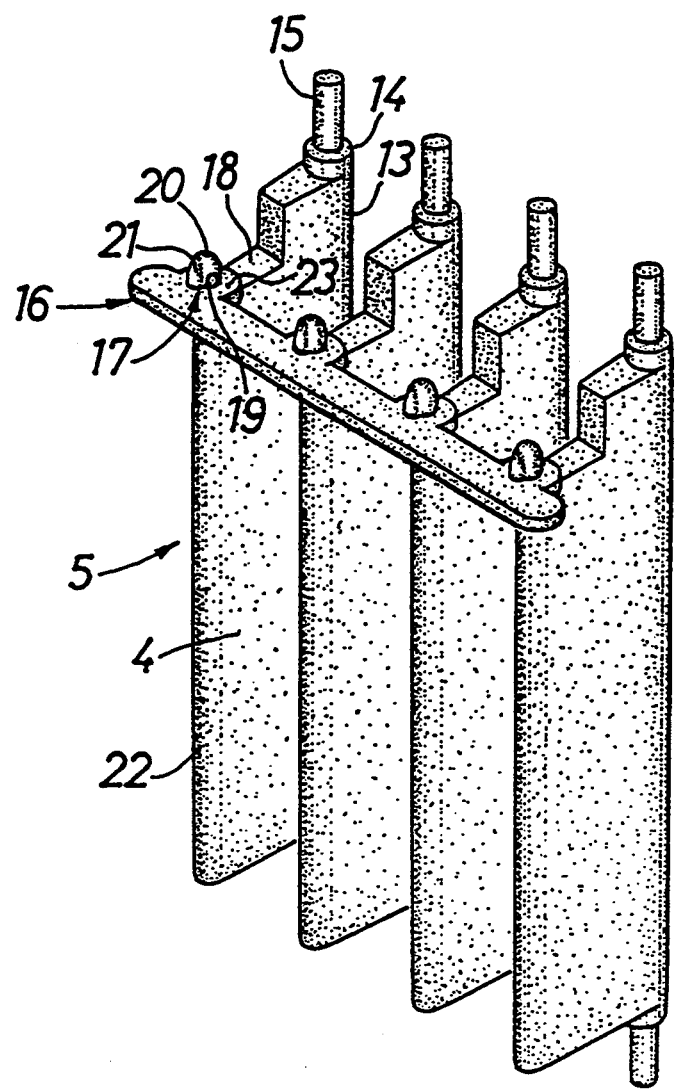
FIG. 5 is a perspective view illustrating the relation between blades and an interlocking link.

The blades 5 are adapted to be turned in operative association with one another and to this end, each blade 5 has a pivotally mounting portion 17 for an interlocking link 16. As best shown in FIGS. 3 and 5, the pivotally mounting portion 17 is comprised of a pivotally supporting shaft 20 projectingly provided on a notch-like common end 18 of each blade body 4 in parallel to the support shaft 15 to extend through a pivotally supporting bore 19 in the interlocking link 16, and a slip-off preventing projection 21 located at a protruding end of the pivotally supporting shaft 20 to engage an opening edge of the pivotally supporting bore 19. The slip-off preventing projection 21 protrudes outwardly from rear edge of the blade body 4 and is forcedly inserted through the pivotally supporting bore 19 in the interlocking link 16 by utilizing the resilient property of an annular portion 23 of the interlocking link 16. As best shown in FIGS. 1 and 2, an operating knob 24 is slidably mounted to only one of the blade body 4 for sliding movement in a longitudinal direction of the blade body Thus, if the operating knob 24 is turned vertically, the blades 5 are turned upwardly or downwardly through the interlocking link 16.

With the above-described construction, the pivotally mounting portion 17, i.e., the pivotally supporting shaft 20 and the slip-off preventing projection 21 can be accommodated within a range of the thickness of each blade 5, thereby reducing the spacing between the blades. This enables the number of the blades 5 to be increase, so that the direction of wind can be adjusted in accordance with any desire. It does not look that the pivotally mounting portion 17 protrudes from one surface of the blade 5 as viewed at any rotated position of the blade 5, leading to a good appearance.

Referring to FIGS. 1 and 2, another housing 25 of synthetic resin is bonded to a rear end of the housing 3, and a plurality of blades 26 of synthetic resin for adjusting the lateral direction of wind are mounted within the housing 25. Support shafts 27 are mounted at opposite ends of each of the blades 26, respectively, and are rotatably supported respectively on upper and lower opposed wall portions 29 which constitute a peripheral wall 28 of the housing 25, and an interlocking link 30 is pivotally supported on the blades 26. A toothed portion 31 is formed on the middle blade 26 and meshed with a toothed portion 32 of the operating knob 24. Thus, if the operating knob 24 is slid in a lateral direction, the blades 26 are turned to change the direction of wind to such lateral direction.

A two-stage injection molding process for producing the abovedescribed air-conditioning blow-out device 1 will now be described. In this molding process, a procedure is employed which comprises forming the housing 3 at a primary injection step, and forming the blades 5 at a secondary injection step by use of the shaft bores 10 in the housing 3 as cavities for molding the support shafts.

FIGS. 6 to 11 illustrate a primary injection molding apparatus 33 used at the primary injection step for forming the housing 3. The apparatus 33 comprises a first movable opening/closing die 34, a second stationary opening/closing die 35 opposed to the first die 34, and a plurality (e.g., a pair in the illustrated embodiment) of first slide dies 36 adapted to be clamped between both the opening/closing dies 34 and 35. The first slide dies 36 each comprises a plurality of shaft bore-forming cores 37, and a plurality of protrusions 38 each arranged in a row with each core 37 and are slidably mounted in an opposed relation to each other on the second opening/closing die 35.

First step

Figure 6:
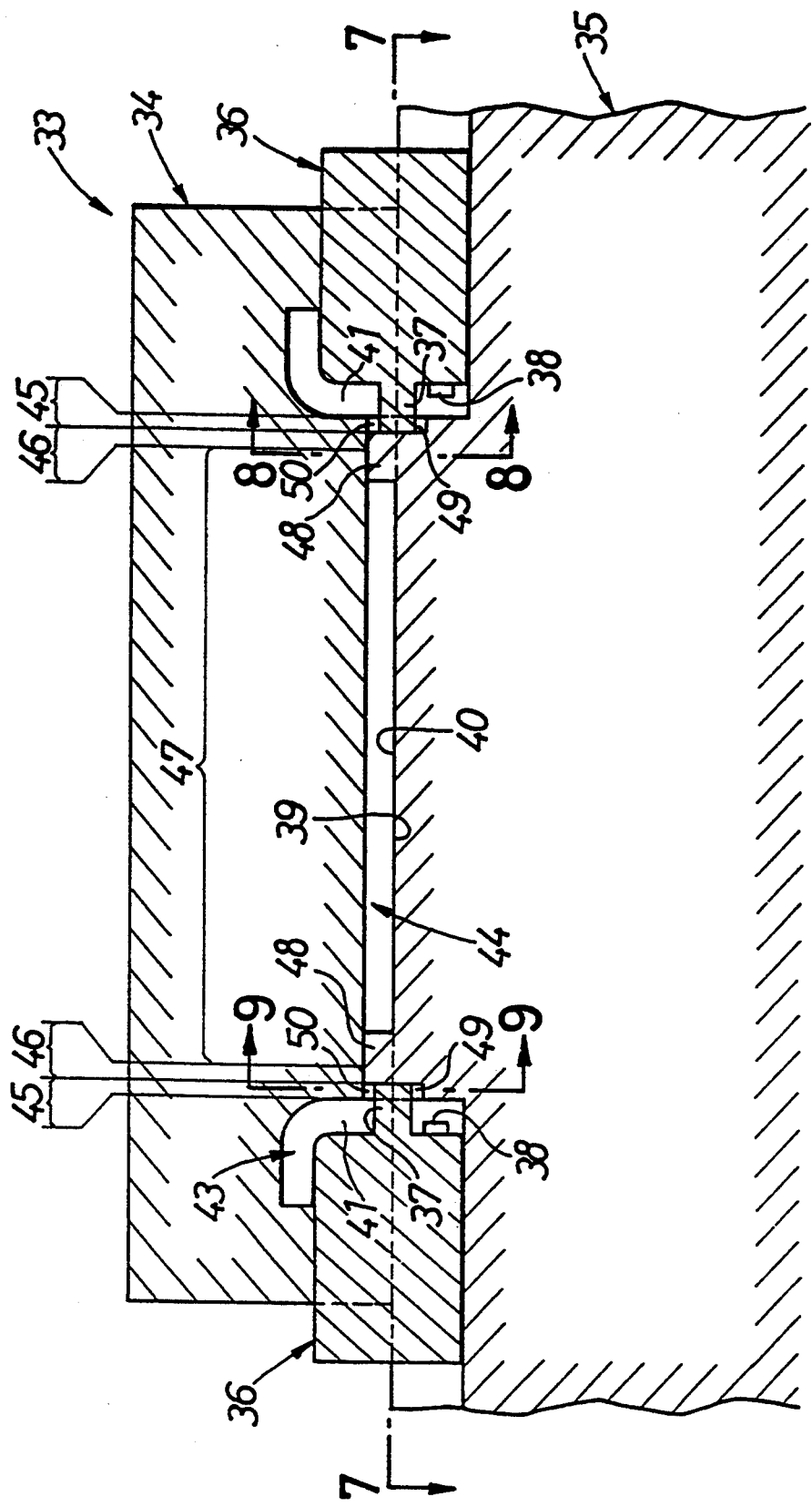
FIG. 6 is a longitudinal sectional view illustrating one example of a primary injection molding apparatus and corresponding to a sectional view taken along a line 6—6 in FIG. 7.
Figure 7:
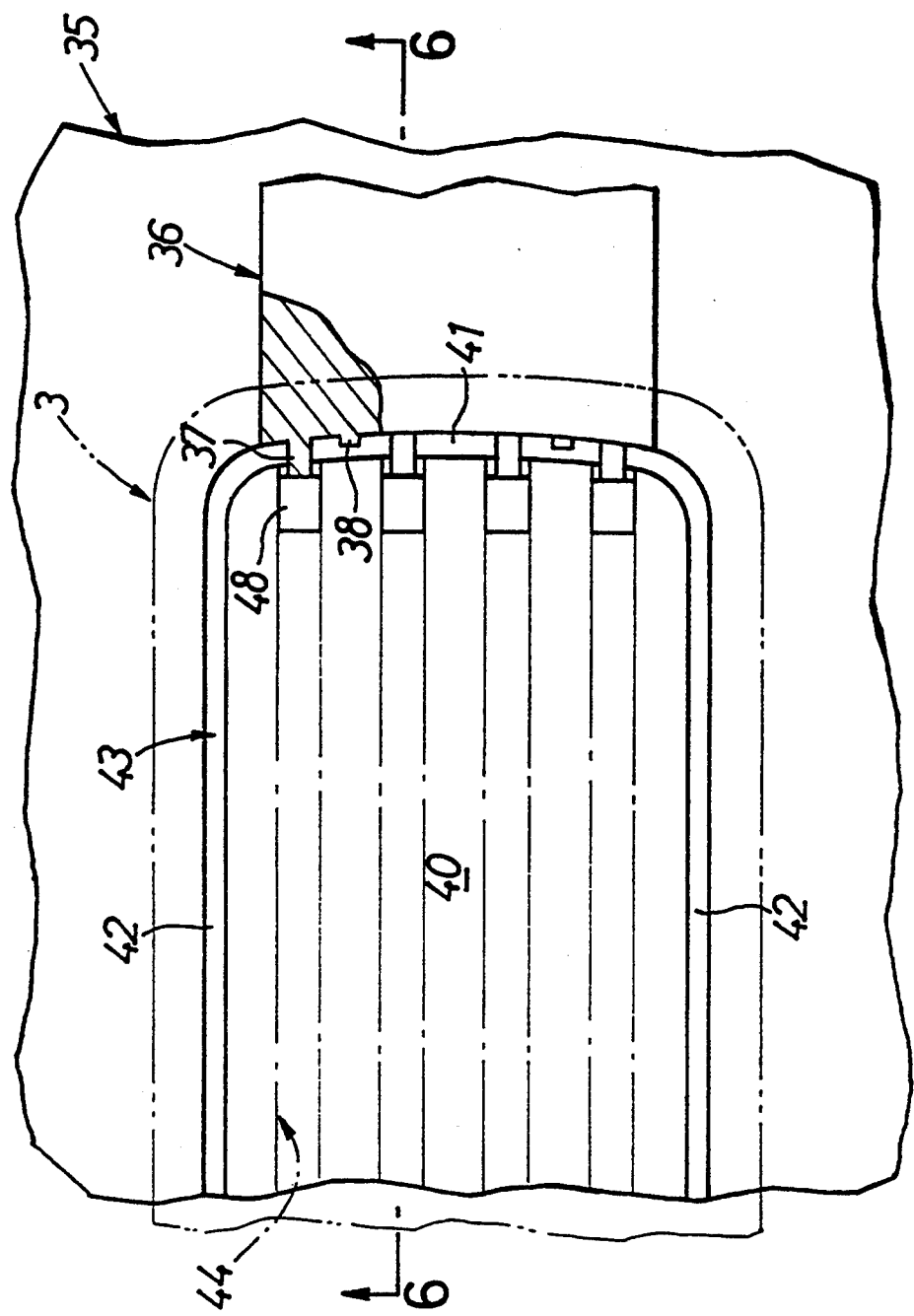
FIG. 7 is a view taken along a line 7—7 in FIG. 6.

As is shown in FIGS. 6 and 7, the first opening/closing die 34 is lowered, and both the opening/closing dies 34 and 35 are closed, and the first slide dies 36 are clamped between both the opening/closing dies 34 and 35.

This causes an axis of each shaft bore-forming core 37 of the first slide die 36 to be aligned with matched surfaces 39 and 40 of the opening/closing dies 34 and 35, thereby defining a pair of areas 41 corresponding to the pair of opposed wall portions (which will be referred to as opposed wall portion-corresponding areas hereinafter) and including the cores 37 and the protrusions 38, and a pair of areas 42 corresponding to the pair of opposed wall portions and substantially perpendicular to the areas 41. Both the areas 41 and 42 constitute a first cavity 43 for forming the peripheral wall 6 and the flange 7 of the housing 3.

The opening/closing die 34 has a plurality of semicircular section recesses 44 opened into the matched surface 39 thereof with opposite ends communicating with the first cavity 43. Each of opposite ends of each first recess 44 is an area 45 corresponding to the boss (which will be referred to as boss-corresponding area hereinafter) and is used to form a half of the boss 11. A portion located inside each of the boss-corresponding areas 45 is a protruding portion-corresponding area 46 and used to form a half of the protruding portion 14 of each blade 5. Further, there is a front edge-corresponding area 47 lying between both the boss-corresponding areas 46 and used to form the front edge 13 of each blade 13.

Figure 8:
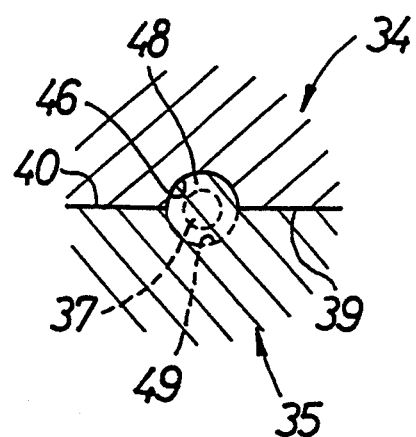
FIG. 8 is a sectional view taken along a line 8—8 in FIG. 6.

As is shown in FIGS. 6, 7 and 8, a plurality (e.g., a pair per first recess 44 in the illustrated embodiment) of semi-circular section dammed projections 48 projectingly provided on the matched surface 40 of the second opening/closing die 35 are each fitted into the protruding portion-corresponding area 46 in the first recesses 44 simultaneously with formation of the first cavity 43, respectively.

Figure 9:
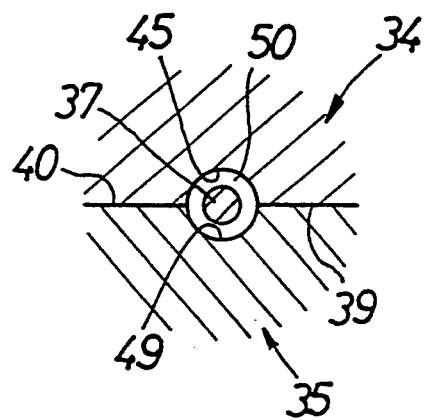
FIG. 9 is a sectional view taken along a line 9—9 in FIG. 6.

As a result, a plurality of second cavities 50 for forming the bosses 11 are defined around tip ends of the shaft bore-forming cores 37 which abut against end faces of the dammed projections 48, as shown in FIGS. 6, 7 and 9, by cooperation of a pair of semi-circular section recesses 49 opened into the matched surface 40 of the second opening/closing die 35 with the boss-corresponding area 45 of each first recess 44. Each of the second cavities 50 communicates with the first cavity 43, but is disconnected from the front edge-corresponding area 47 of each first recess 44 by the dammed projections 48.

Second step

Figure 10:
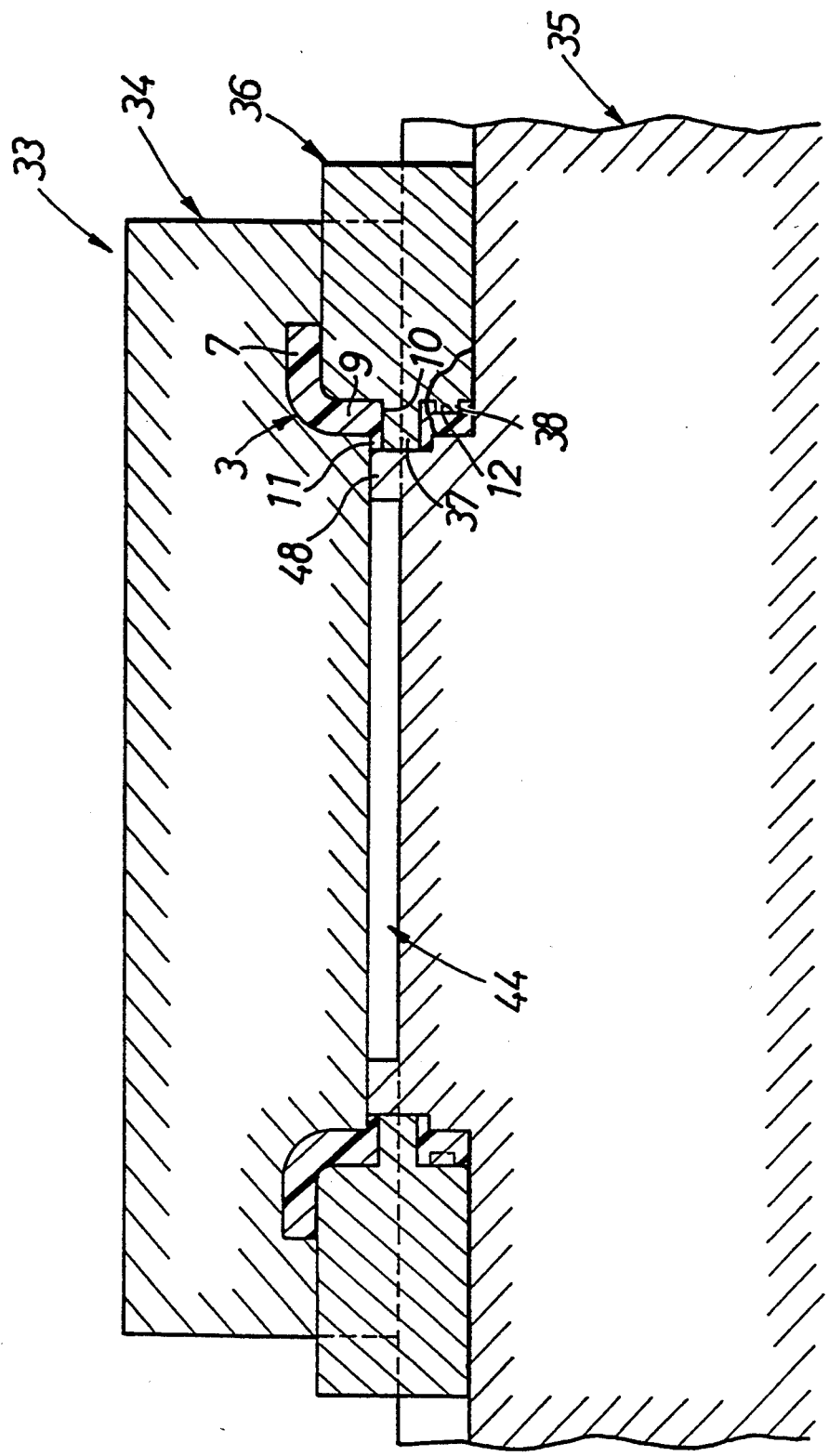
FIG. 10 is a longitudinal sectional view of the primary injection molding apparatus shown with a housing formed.

As is shown in FIG. 10, a polyethylene (PP)-based resin as a synthetic resin is primarily injected through a gate (not shown) into the first cavity 43 and the second cavities 50 to form the housing 3. The plurality of recesses 12 for use at the releasing step are formed in the outer surfaces of the opposed wall portions 9 of the housing 3 by the protrusions 38. In this case, the boss 11 is formed distinctly, because the protruding portion-corresponding area 46 of each first recess 44 is closed by the dammed projection 48.

Third step

Figure 11:
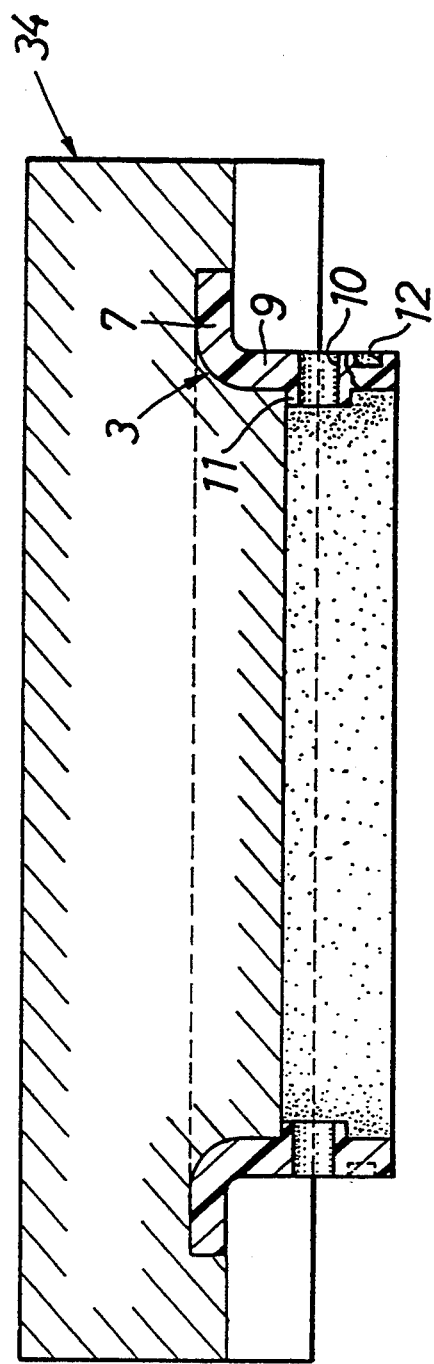
FIG. 11 is a longitudinal sectional view of a first opening/closing die with the housing attached thereto.

Both the first slide dies 36 are retreated, so that the shaft bore-shaping cores 37 are removed out of the corresponding shaft bores 10. Then, the first opening/closing die 34 is lifted, so that both the opening/closing dies 34 and 35 are opened with the housing 3 left attached to the first opening/closing die 34, as shown in FIG. 11.

The molding of the housing 3 is completed via the above-described steps.

FIGS. 12 to 17 illustrate a secondary injection moulding apparatus 51 used at the secondary injecting step for forming the blades 5. The apparatus 51 comprises the first movable opening/closing die 34 commonly used in the primary injection molding apparatus 33, a third stationary opening/closing die 52 opposed to the first movable opening/closing die 34, and a plurality (e.g., a pair in the illustrated embodiment) of second slide dies 53 and 54 adapted to be clamped between both the opening/closing dies 34 and 52. The second slide dies 53 and 54 are slidably mounted in an opposed relation to each other on the third opening/closing die 52 and each include a plurality of protrusions 55 corresponding to the plurality of recesses 12 opened in the outer surface of each of the opposed wall portion 9 of the housing 3, and a plurality of recesses 56 adapted to form the support shaft 15 with the tip ends thereof protruding from the outer surface of each of the opposed wall portion 9.

One of the second slide dies 54 has a plurality of forming projections 57 for forming the notch-like common end 18 of each blade 5.

Fourth step

As is shown in FIGS. 12 to 15, the first opening/closing die 34 is lowered, so that both the opening/closing dies 34 and 52 are closed, and the pair of second slide dies 53 and 54 are clamped between both the opening/closing dies 34 and 52.

Figure 12:
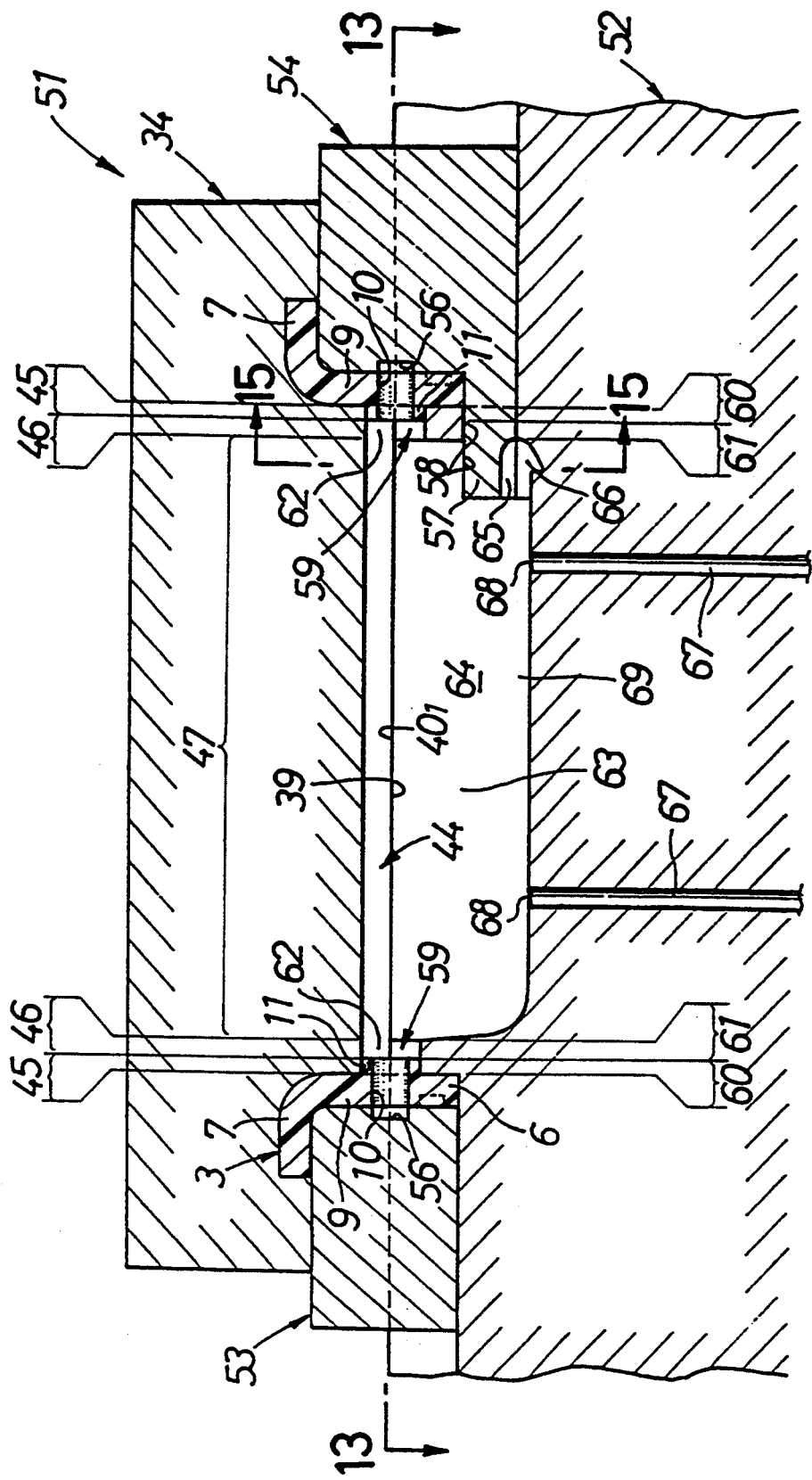
FIG. 12 is a longitudinal sectional view illustrating one example of a secondary injection molding apparatus and corresponding to a sectional view taken along a line 12—12 in FIG. 13.
Figure 13:
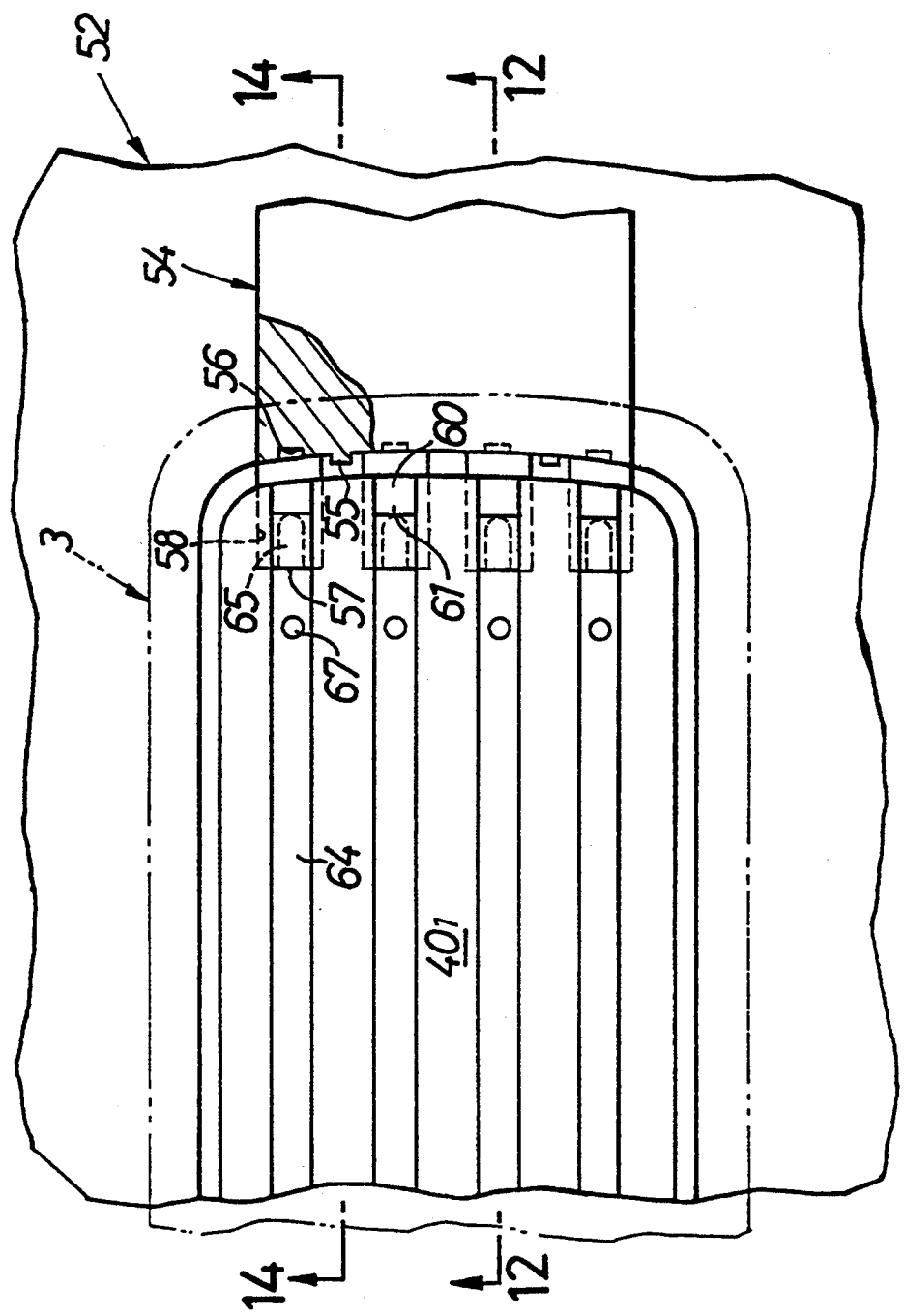
FIG. 13 is a view taken along a line 13—13 in FIG. 12.
Figure 14:
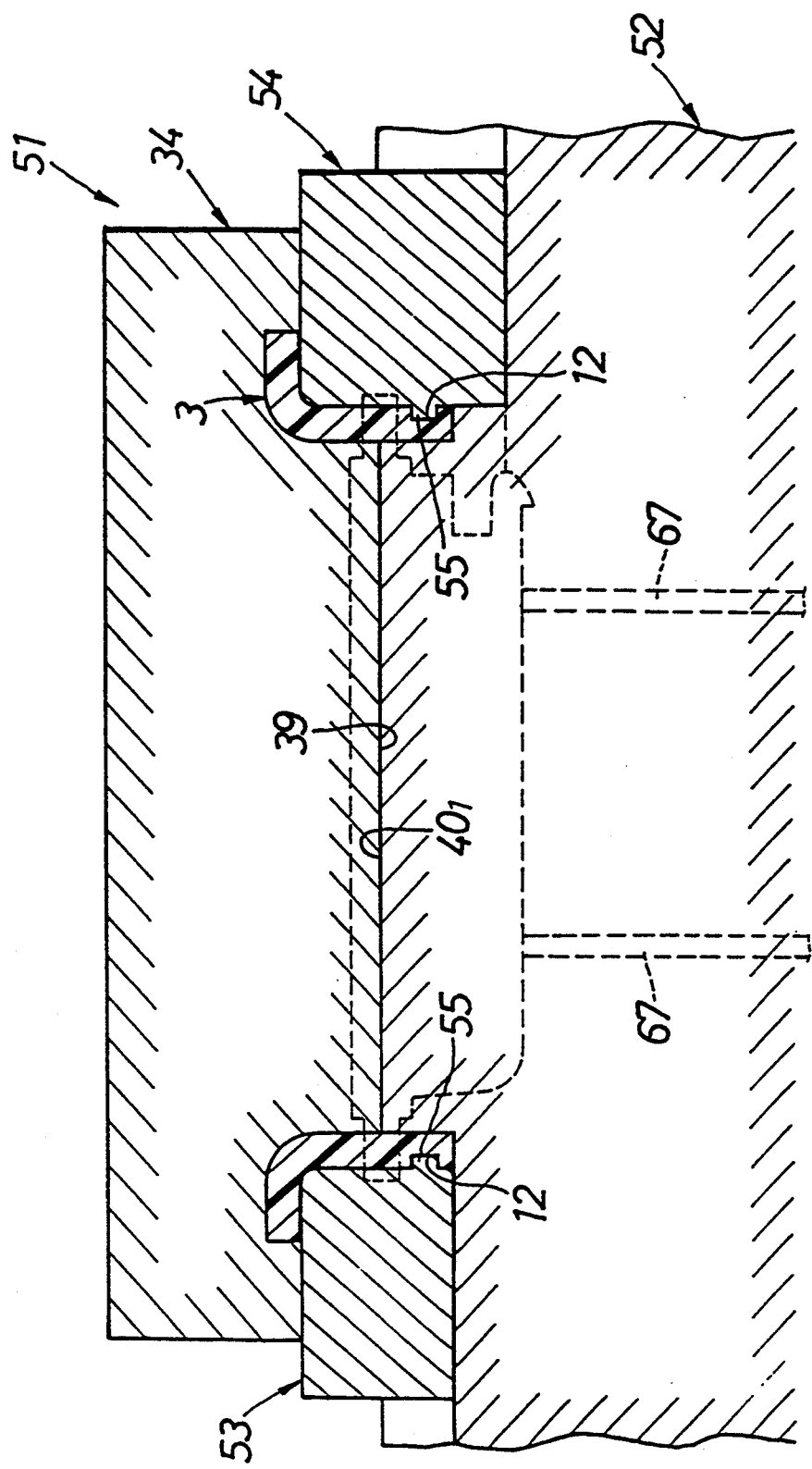
FIG. 14 is a longitudinal sectional view illustrating another example of the secondary injection molding apparatus and corresponding to a sectional view taken along a line 14—14 in FIG. 13.
Figure 15:
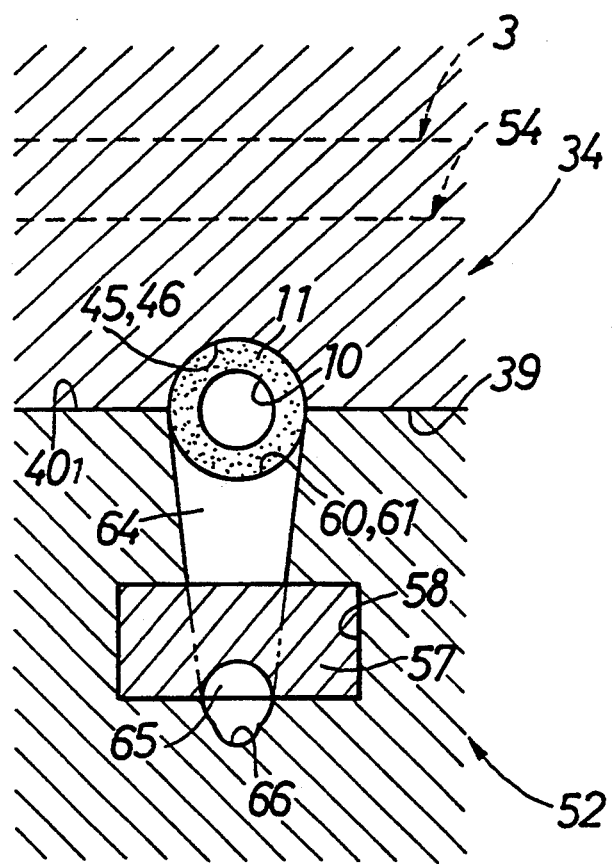
FIG. 15 is a sectional view taken along a line 15—15 in FIG. 12.

Thus, the peripheral wall 6 and the front flange 7 of the housing 3 are clamped between the opening/closing dies 34 and 52 and the second slide dies 53 and 54, so that the protrusions 55 of each of the second slide dies 53 and 54 are fitted into the recesses 12 of the housing 3, respectively. And the recesses 56 are disposed coaxially with the shaft bores 10 in the housing 3, respectively, as best shown in FIG. 14. Further, as best shown in FIGS. 12 and 15, the forming portions 57 of the one second slide die 54 are passed through slide bores 58 in the third opening/closing die 52, respectively.

The third opening/closing die 52 has a plurality of second recesses 59 having a semi-circular section and opposed to the first recesses 44 in the first opening-closing die 34, respectively, so that the bosses 11 are clamped between boss-corresponding areas 45 and 60 of the first and second recesses 44 and 59, respectively. A third cavity 62 for forming the protruding portion 14 is defined between each of the protruding portion-corresponding areas 46 of the first recesses 44 and each of protruding portion-corresponding areas 61 of the second recesses 59. The third cavities 62 communicate with the shaft bores 10 and are disposed coaxially with the shaft bores 10 and the bosses 11, respectively.

Further, a fourth cavity 64 for forming the blade body 4 is defined between the front edge-corresponding area 47 of each of the first recess 44 in the first opening-closing die 34 and each of deep recesses 63 which are opened in a matched surface $40_1$ between the two second recesses 59 of the third opening/closing die 52. The fourth cavities 64 communicates with the third cavities 62, respectively. Each of the shaft bores 10 in the housing 3 functions as a fifth cavity for forming the support shaft 15.

A sixth cavity 65 for forming the pivotally supporting portion 20 is defined between each of the forming portions 57 of the one second slide die 54 and the slide surface of the third opening/closing die 52. A seventh cavity 66 for forming the slip-off preventing projection 21 is defined in the third opening/closing die 52 and opened into each of the sixth cavities 65. In this way, the structure of each of the sixth and seventh cavities 65 and 66 is simplified in correspondence to the structure of the pivotally mounting portion 17.

The third opening/closing die 52 is provided with a plurality of ejector pins 67. Abutment faces 68 of each pair of ejector pins 67 are exposed to rear edge-corresponding area 69 which forms the rear edge 22 of the blade body 4.

Fifth step

Figure 16:
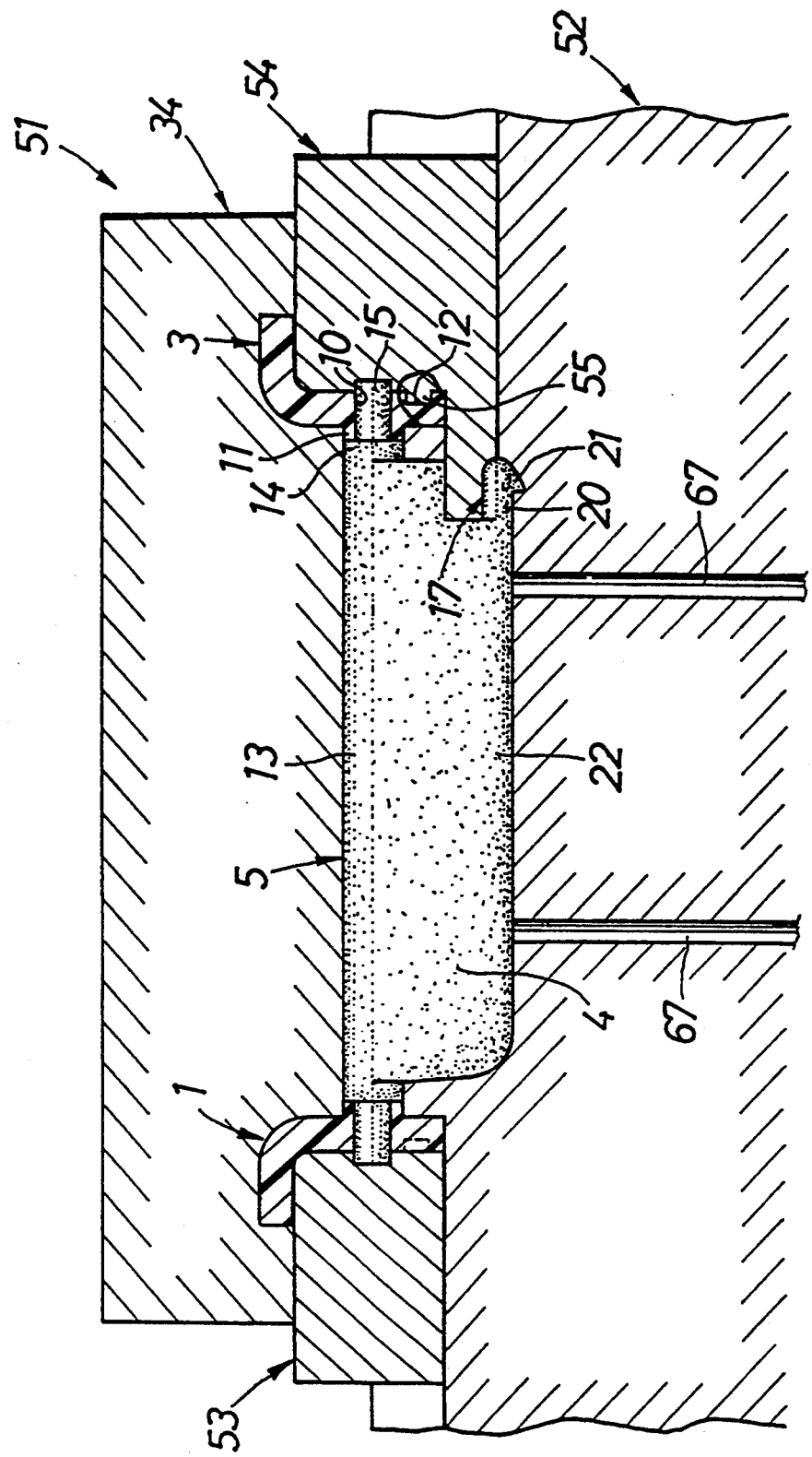
FIG. 16 is a longitudinal sectional view of the secondary injection molding apparatus shown with a blow-out port device formed.
Figure 17:
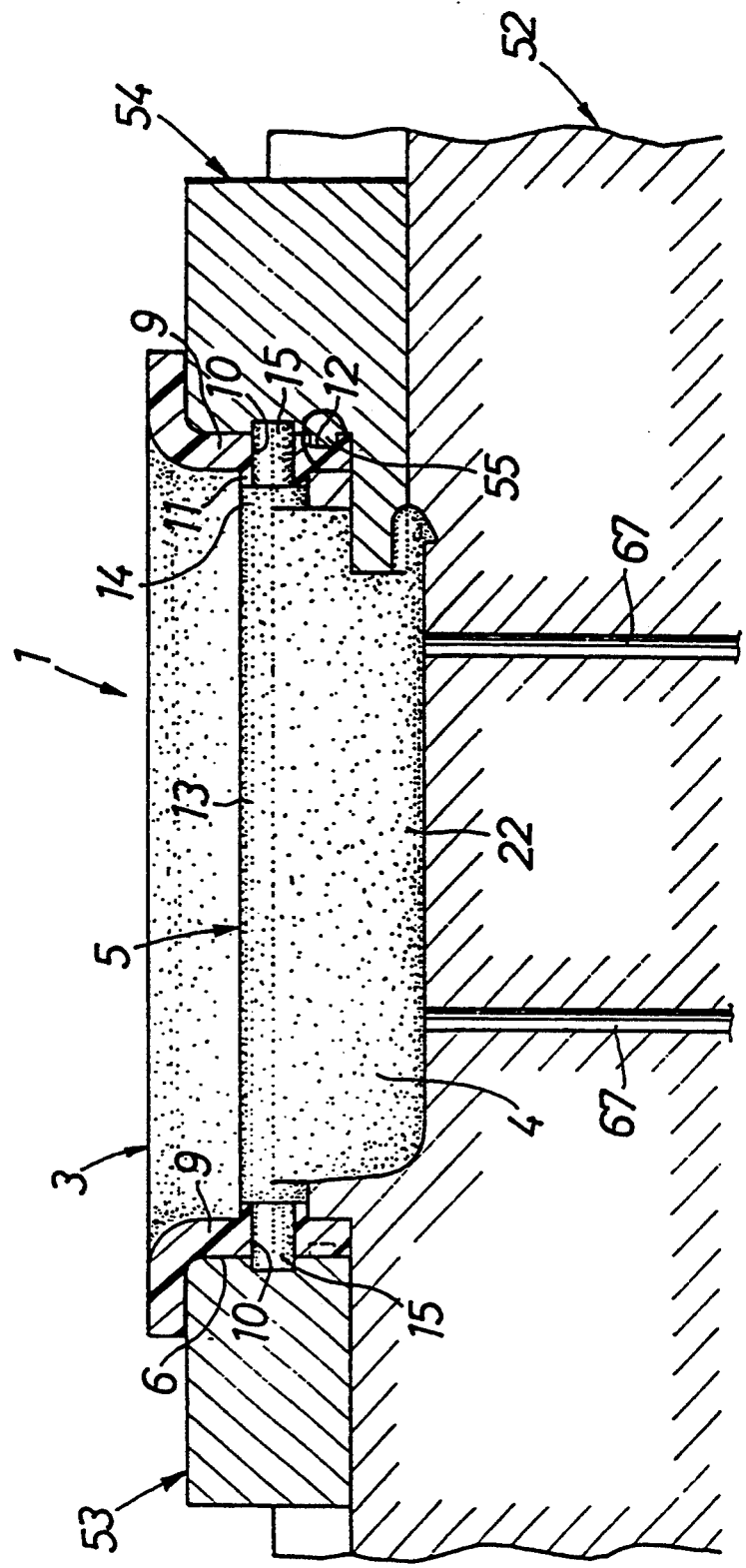
FIG. 17 is a longitudinal sectional view of the secondary injection molding apparatus shown with the blow-out port device left on a third opening/closing die.

As is shown in FIG. 16, a polybutylene terephthalate (PBT) based resin as a synthetic resin is secondarily injected through a gate (not shown) into the third to seventh cavities 62, 64, 10, 65 and 66 to form blades 5, thereby providing a blow-out port device 1.

In this case, the protruding portions 14 are formed coaxially with the bosses 11, respectively, because the third cavities 62 for forming the protruding portions of the blades 5 are arranged coaxially with the bosses 11, respectively.

In addition, because the primary and secondary injection steps are carried out by common use of the opening/closing die 34, the cost of the opening/closing dies can be reduced, and the cost and working time required to replace the die can be omitted to improve the mass productivity of the blow-out port device.

Sixth step

The first opening/closing die 34 is lifted to open both the opening/closing dies 34 and 52. And the blow-out device 1 left on the third opening/closing die 52 by fitting engagement of the recesses 12 in the housing 3 with the protrusions 55 of the second slide dies 53 and 52, respectively.

Then, the second slide dies 53 and 54 are retreated, so that the protrusions 55 thereof are separated from the corresponding recesses 12 of the housing 3, and the recesses 56 are separated from the corresponding tip ends of the support shafts 15, respectively. Then, the ejector pins 67 are brought into abutment against the rear edges 22 of the blade bodies 4 to eject the blow-out port device 1 from the third opening/closing die 52.

When the device is released from the die in this manner, the blades 5 are ejected by the ejector pins 67 and hence, a force supporting the housing 3 is only applied to each of the support shafts 15, and the force of this degree cannot damage each of the support shafts. In addition, because an ejecting force is applied directly to each of the blades 5 which are tightly contacted with the forming surface, the releasability of each blades 5 is good and therefore, the blade 5 cannot be damaged.

Further, the appearance of the blow-out port device 1 cannot be injured from the view point that each of the recesses 12 in the housing 3 is located in the outer surface of each of the opposed wall portions 9 and that these opposed wall portions 9 are disposed within the instrument panel 8. Further, an ejector pin abutment portion of each of the blades 5 is established at the rear edge 22 of the blade 5 which is not visible from the front of the device 1 and therefore, the appearance of the blow-out port device cannot be injured likewise.

Figure 18:
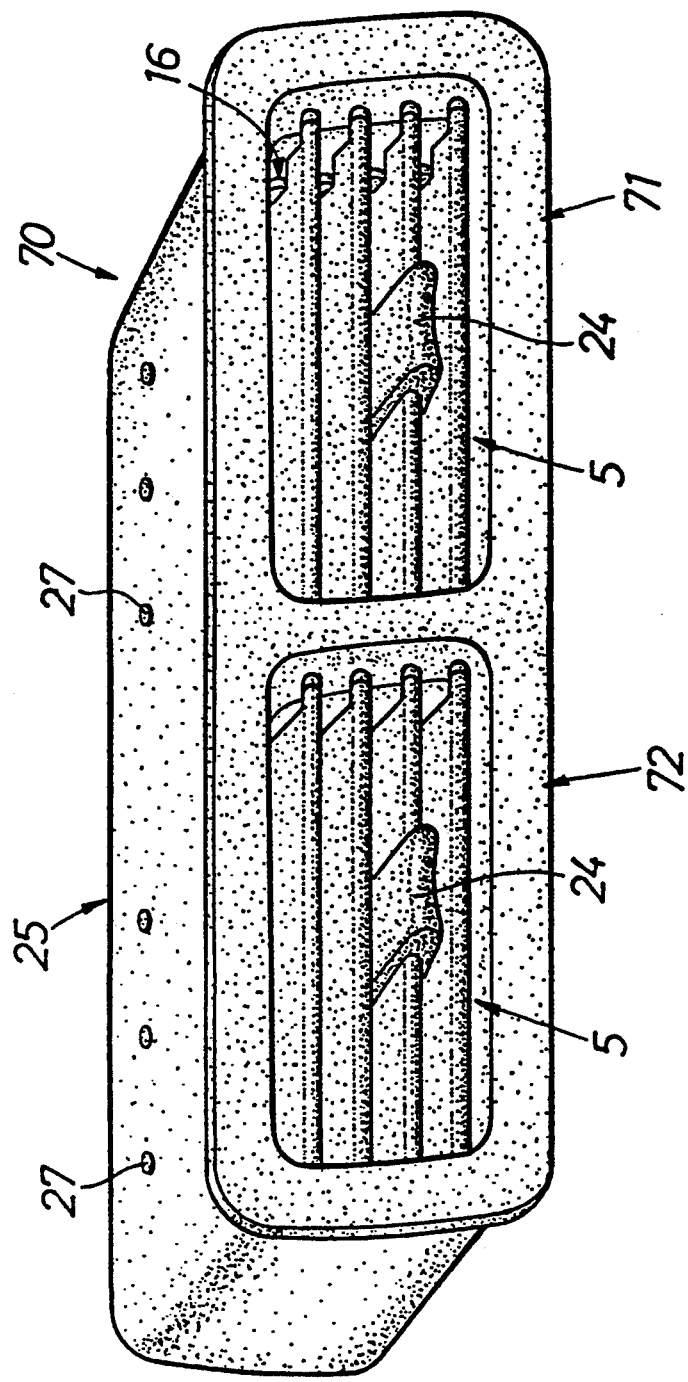
FIG. 18 is a perspective view illustrating another example of an air-conditioning blow-out port device.

FIG. 18 illustrates another example of an air-conditioning blow-out port device 70. This device 70 has a construction similar to the construction of the two blow-out port devices arranged laterally. The above-described two-stage injection molding process is also applicable to the molding of such a blow-out port device 70. In this case, a pivotally mounting portion 17 for an interlocking link 16 is provided at a right end of each of blades 5 in a right blow-out port structure 71, and at a left end of each of blades 5 in a left blow-out port structure 72.

Figure 19:
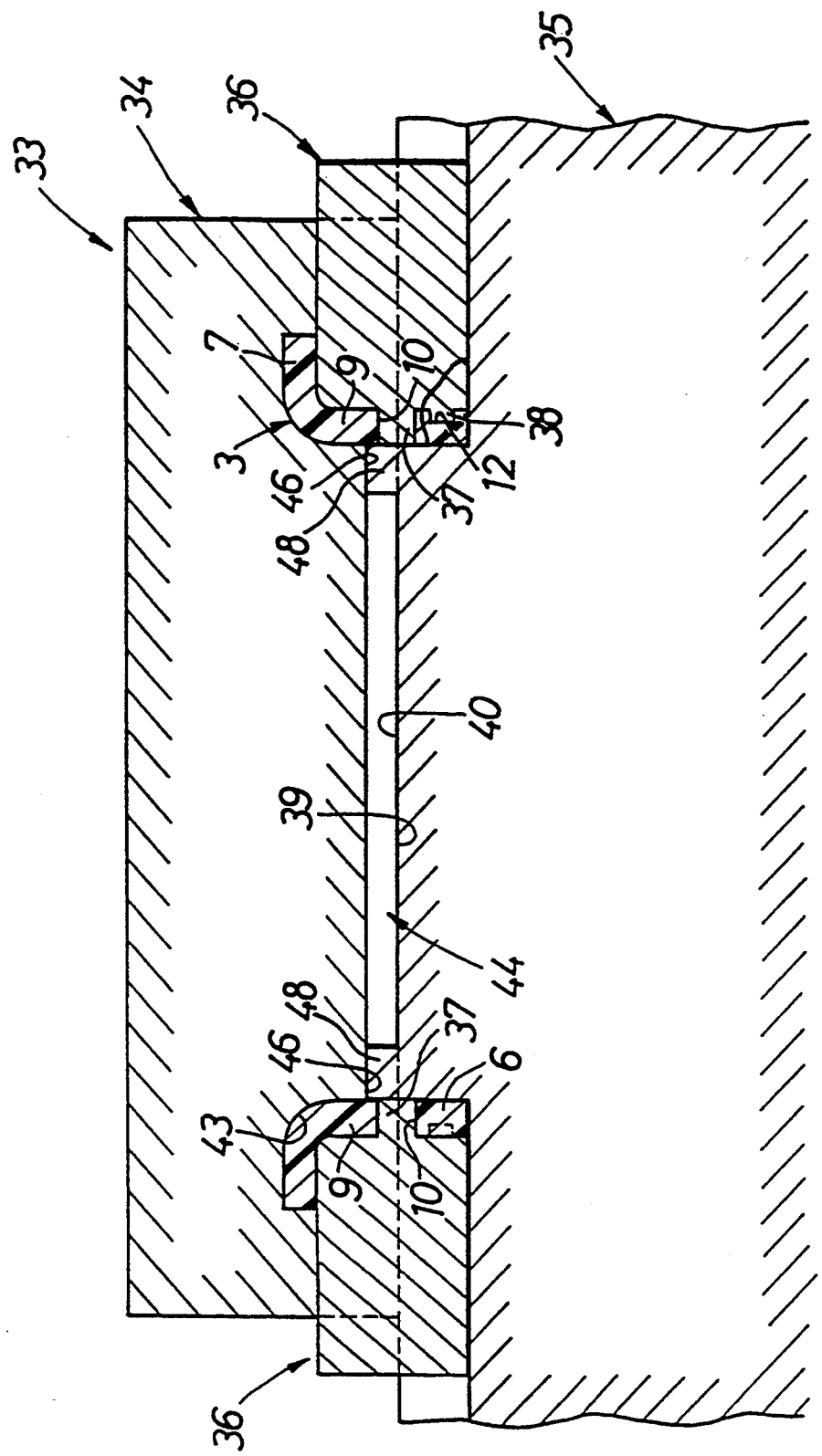
FIG. 19 is a longitudinal sectional view illustrating another example of a primary injection molding apparatus and similar to FIG. 10.
Figure 20:
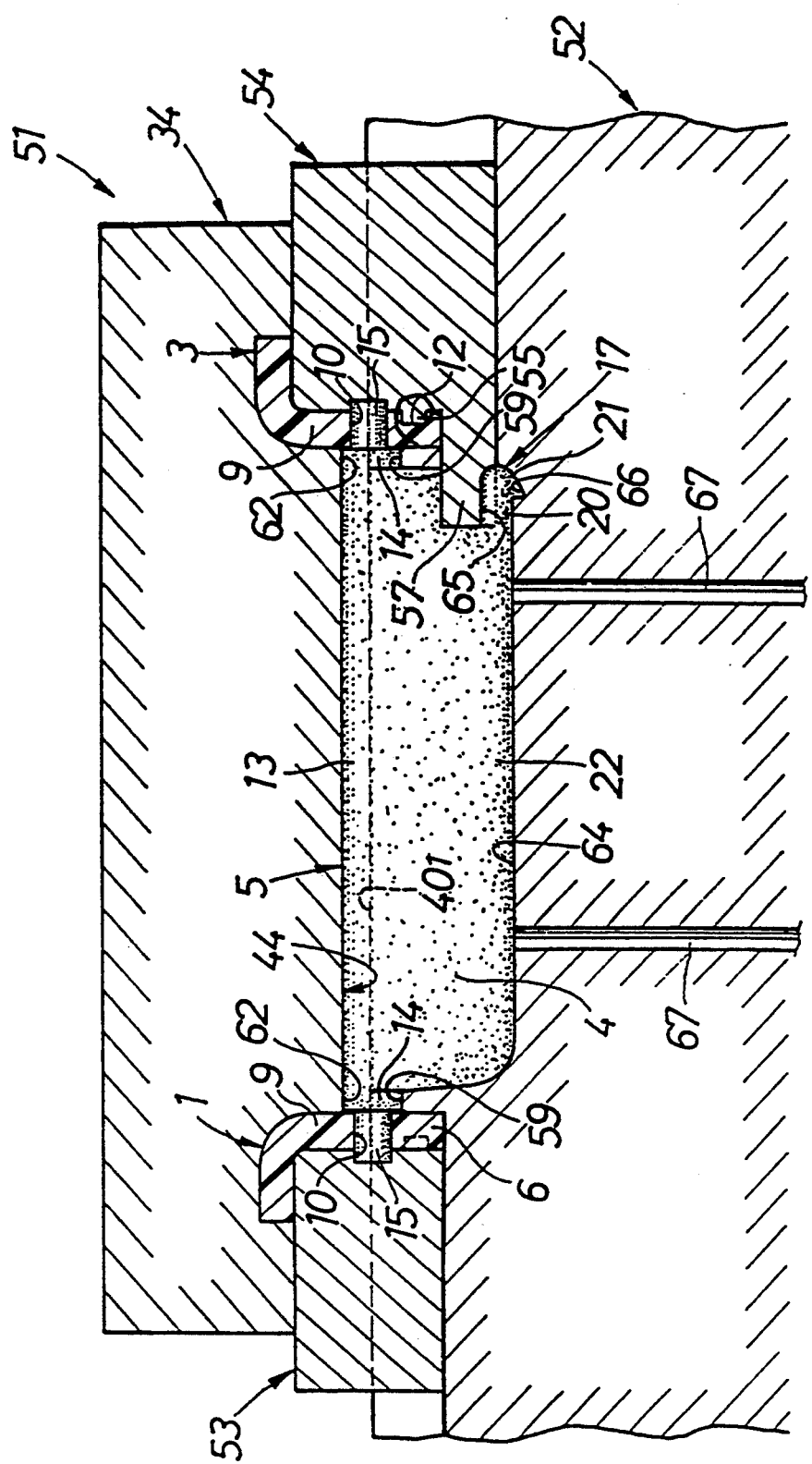
FIG. 20 is a longitudinal sectional view illustrating a further example of a secondary injection molding apparatus and similar to FIG. 16.

FIGS. 19 and 20 show a further example of an air-conditioning blow-out port device 1 of the above-described type and a two-stage injection molding process therefor. This device 1 is comprised of a housing 3 having pairs of shaft bores 10 coaxially arranged in opposed wall portions 9 to extend through the opposed wall portions 9, and a plurality of blades 5. Each of the blades includes a pair of protruding portions 14 having a circular section and abutting against the opposed wall portions 9, a pair of support shafts 15 coaxially provided on end faces of the protruding portions 14 to project therefrom and rotatably fitted in the shaft bores 10 and a pivotally mounting portion 17 similar to that described above. The protruding portions 14 and the support shafts 15 being provided at opposite ends of a blade body disposed within the housing, and a pivotally mounting portion 17 similar to that described above.

Steps which will be described below are employed when this air-conditioning blow-out port device 1 is produced in a two-stage injection molding process by using a synthetic resin.

First step

As is shown in FIG. 19, opposed first and second opening/closing dies 34 and 35 are closed, so that a plurality (e.g., a pair in the illustrated embodiment) of first slide dies 36 having a plurality of shaft bore forming cores 37 are clamped between both the opening/closing dies 34 and 35. This causes a first cavity 43 for forming the housing 3 to be formed so as to include the shaft bore forming cores 37 with their axes aligned with the matched surfaces 39 and 40 of the opening/closing dies 34 and 35. In addition, a plurality of dammed projections 48 of a semi-circular section projectingly provided on the matched surface 40 of the second opening/closing die 35 is fitted into a plurality of first semi-circular section recesses 44 which are opened in the matched surface 39 of the first opening/closing die 34 and used for forming a half of the protruding portion 14.

Second step

A synthetic resin is primarily injected into the first cavity 43 to form a housing 3.

Third step

The shaft bore forming cores 37 of the first slide die 36 are withdrawn out of the corresponding shaft bores 10 and then, the first and second opening-closing dies 34 and 35 are opened with the housing 3 left attached to the first opening-closing die 34.

Fourth step

As is shown in FIG. 20, the first and third opening-closing dies 34 and 52 are closed with the former die 34 opposed to the latter die 52, thereby clamping the pair of second slide dies 53 and 54 between both the opening-closing dies 34 and 52, while clamping the housing 3 between both the opening/closing dies 34 and 52 and both the second slide dies 53 and 54. In addition, a plurality of second cavities 62 for forming the protruding portions 14 are defined between the first recesses 44 and a plurality of second recesses 59 of a semicircular section opened into the matched surface $40_1$ of the third opening/closing die 52 and opposed to the first recesses 44, respectively. Further, a plurality of third cavities 64 for forming the blade bodies 4 are defined between both the opposed second cavities 62.

Yet further, a fourth cavity 65 for forming the pivotally supporting shaft 20 is defined between each of the forming portions 57 in the one second slide die 54 and the slide surface of the third opening/closing die 52, and a fifth cavity 66 formed in the third opening/closing die 52 for forming the slip-off preventing projection 21 is opened into each of the fourth cavities 65.

Fifth step

Each of the shaft bores 10 in the housing 3 is used as a sixth cavity for forming the support shaft 15, and a synthetic resin is secondarily injected into the second to sixth cavities 62, 64, 65, 66 and 10 to form blades 5.

Figure 21:
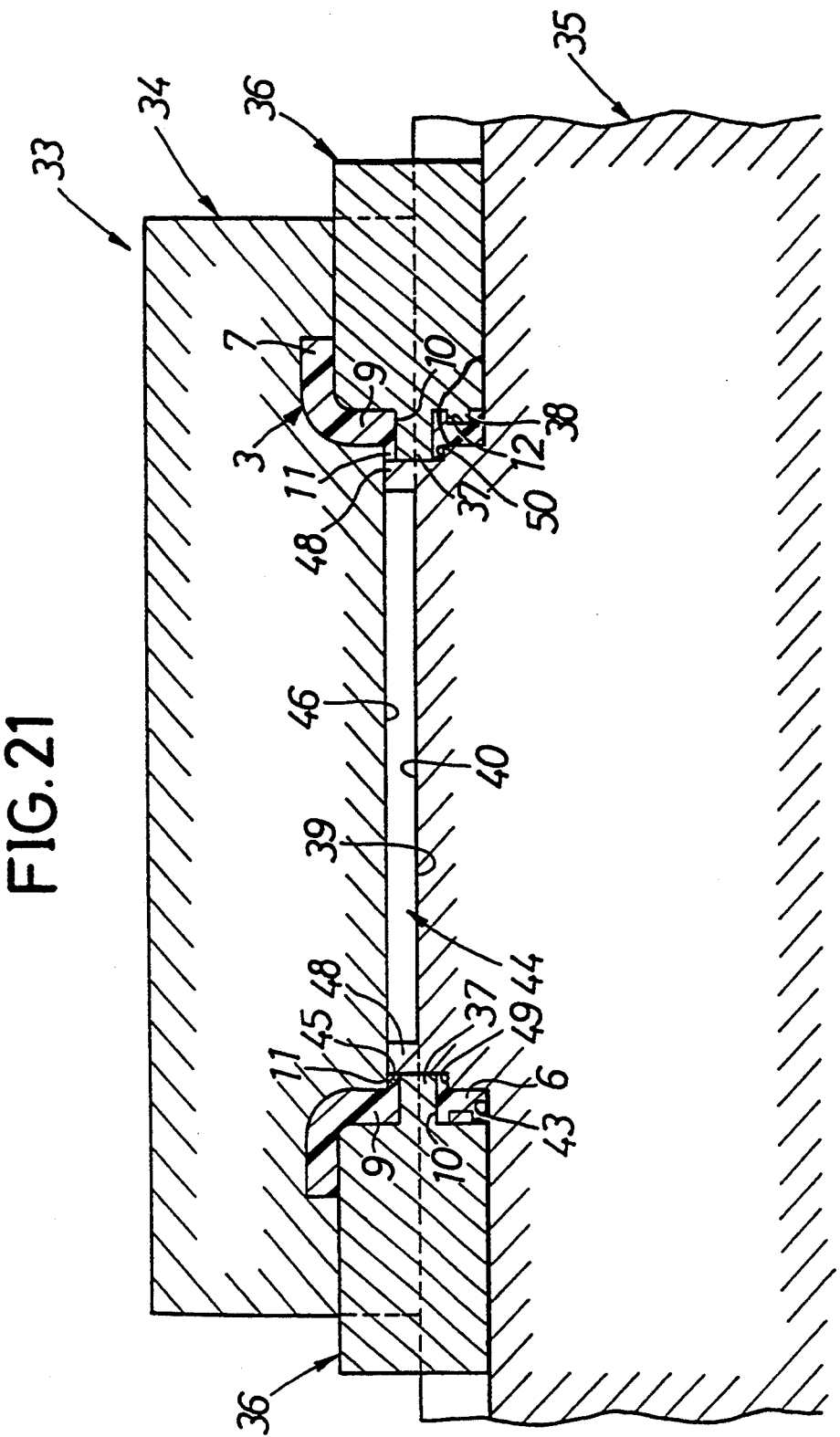
FIG. 21 is a longitudinal sectional view illustrating a further example of a primary injection molding apparatus and similar to FIG. 10.
Figure 22:
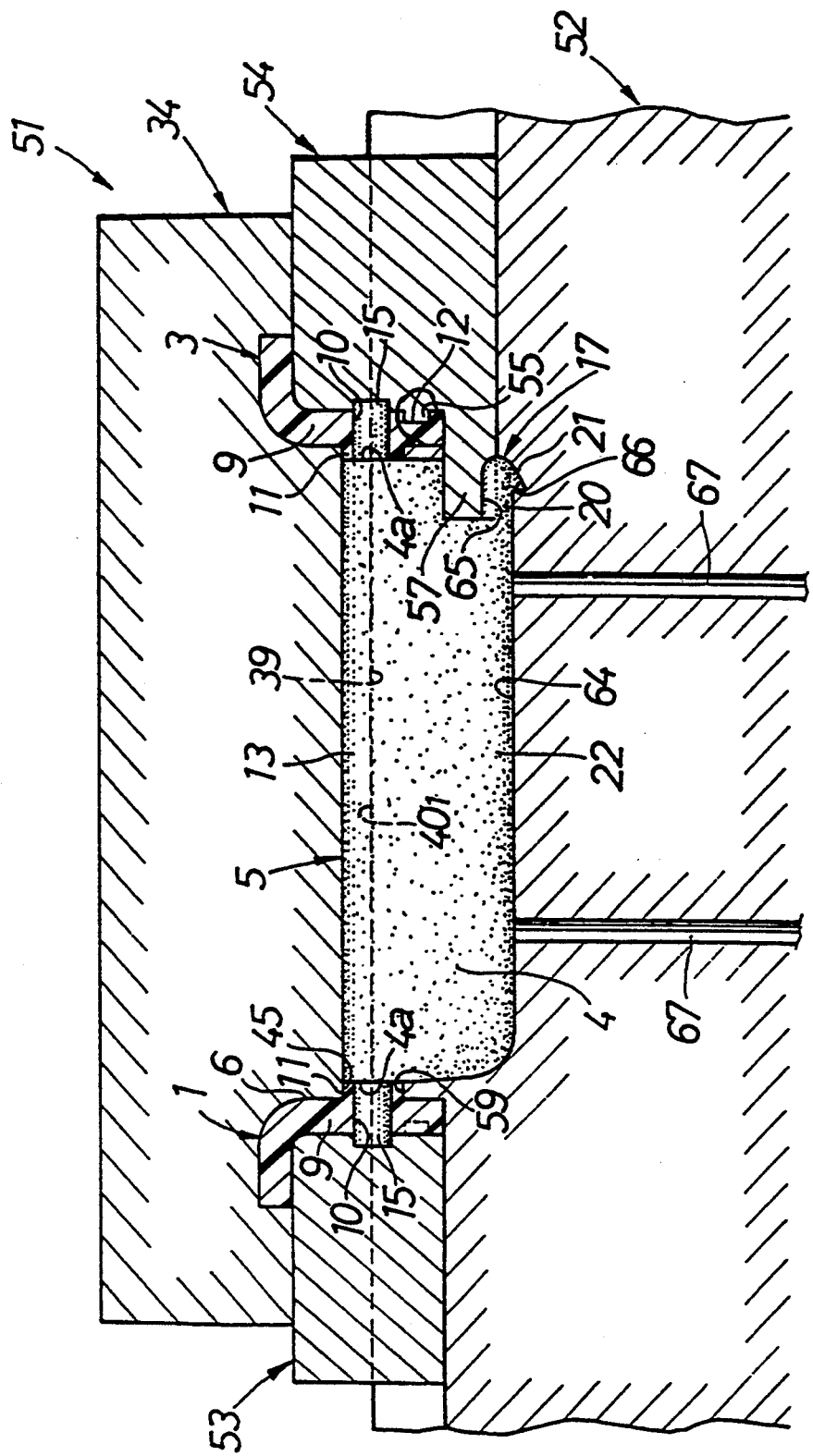
FIG. 22 is a longitudinal sectional view illustrating a yet further example of a secondary injection molding apparatus and similar to FIG. 16.

FIGS. 21 and 22 illustrate a further example of an air-conditioning blow-out port device 1 and a two-stage injection molding process therefor. The device 1 is comprised of a housing 3 which includes a peripheral wall 6 having pairs of shaft bores 10 coaxially arranged in opposed wall portions 9 to extend through the opposed wall portions 9, and pairs of bosses 11 of a circular section provided on the peripheral wall 6 coaxially with the corresponding shaft bores 10 to define openings of the shaft bores 10 inside the opposed wall portions 9; and a plurality of blades 5 which each include a blade body 4 disclosed within the housing 3. The blades 5 further includes a front edge 13 adjacent a front surface of the housing which is formed to have the same diameter as the boss 11 and with opposite ends 4a abutting against the pair of bosses 11; a pair of support shafts 15 projectingly provided at the opposite ends 4a of the blade body 4 coaxially with the front edge 13 and rotatably fitted in the shaft bores 10; and a pivotally mounting portion 17 similar to that described above.

Steps which will be described below are employed for forming this air-conditioning blow-out port device 1 in a two-stage injection molding process by use of synthetic resin.

First step

As is shown in FIG. 21, opposed first and second opening/closing dies 34 and 35 are closed, and a plurality, e.g., a pair (in the illustrated embodiment) of opposed slide dies 36 including a plurality of shaft bore forming cores 37 are clamped between both the first and second opening/closing dies 34 and 35. This causes a first cavity 43 for forming the peripheral wall 6 and the front flange 7 of the housing to be defined so as to include base ends of the shaft bore forming cores 37 with their axes aligned with the matched surfaces 39 and 40 of the opening/closing dies 34 and 35. In addition, a plurality of dammed projections 48 of a semi-circular section projectingly provided on the matched surface 40 of the second opening/closing die 35 are fitted into front edge-corresponding areas 46 of a plurality of first recesses 44. The first recesses 44 are opened into the matched surface 39 of the first opening/closing die 34 and commonly used for forming halves of adjacent bosses 11 and front edges 13. And a plurality of second cavities 50 for forming the bosses 11 are each defined around the tip end of each shaft bore forming core 37 abutting against an end face of the corresponding dammed projection 48, by cooperation of the first recesses 44 with a plurality of recesses 49 of a semi-circular section opened into the matched surface 40 of the second opening/closing die 35.

Second step

A synthetic resin is primarily injected into the first and second cavities 43 and 50 to form the housing 3.

Third step

The shaft bore forming cores 37 of the first slide die 36 are withdrawn out of the corresponding shaft bores 10. Then, the first ant second opening/closing dies 34 and 35 are opened, with the housing 3 left attached to the first opening/closing die 34.

Fourth step

The first and third opening/closing dies 34 and 52 are closed with the former die 34 opposed to the latter die 52, thereby clamping the pair of second slide dies 53 and 54 between both the opening/closing dies 34 and 52, while clamping the peripheral wall 6 and the front flange 7 between both the opening/closing dies 34 and 52 and both the second slide dies 53 and 52. In addition, the bosses 11 are clamped between the boss-corresponding areas 45 of the first recesses 44 and a plurality of second recesses 59 of a semi-circular section which are opened into the matched surface $40_1$ of the third opening/closing die 52 and opposed to the first recesses 44 of the first opening/closing die 34, respectively. Further, a plurality of third cavities 64 for forming the blade bodies 4 are defined between the opposed bosses 11.

Further, a fourth cavity 65 for forming the pivotally supporting shaft 20 is defined between each of the forming portions 57 in the one second slide die 54 and the slide surface of the third opening/closing die 52, and a fifth cavity 66 defined in the third opening/closing die 52 for forming the slip-off preventing projection 21 is opened into each of the fourth cavities 65.

Fifth step

Each of the shaft bores 10 in the housing 3 is used as a sixth cavity for forming the support shaft 15, and a synthetic resin is secondarily injected into the third to sixth cavities 64, 65, 66 and 10 to form blades 5.

Components or portions designated by the same characters in the embodiments in FIGS. 19 to 22 indicates the same components or portions as those in the previously described embodiment.

What is claimed is:

1. A process for two-stage injection molding of an air-conditioning blow-out port device by use of synthetic resin, said blow-out port device comprising:

a housing which includes pairs of shaft bores provided in a coaxial arrangement in opposed wall portions of a peripheral wall of said housing to extend through said opposed wall portions, and pairs of circular-section bosses located coaxially with said shaft bores to define openings of said shaft bores at inner surfaces of said opposed wall portions, respectively; and a plurality of blades each including a pair of protruding portions having a same outside diameter as an outside diameter of said bosses and provided at opposite ends of a blade body disposed within said housing to abut against a pair of said bosses, and a pair of support shafts projectingly provided coaxially on end faces of said protruding portions and turnably fitted in the shaft bores of said housing, respectively; wherein said process comprises the steps of:

closing opposed first and second opening-closing dies to clamp a plurality of first opposed slide dies each including a plurality of shaft bore forming cores between both said opening-closing dies, thereby defining a first cavity for forming said peripheral wall of said housing so as to include base ends of said shaft bore forming cores with their axes aligned with matched surfaces of said opening-closing dies, while fitting a plurality of semi-circular section dammed projections projectingly provided on said matched surface of said second opening-closing die into protruding portion-corresponding areas of a plurality of first semi-circular section recesses opened into said matched surface of said first opening-closing die and commonly used for forming halves of adjacent bosses and protruding portions, thereby defining a plurality of second cavities for forming said bosses around tip ends of said shaft bore forming cores abutting against end faces of said dammed projections by cooperation of boss-corresponding areas of said first recesses with a plurality of semi-circular section recesses opened into said matched surface of said second opening-closing die;

primarily injecting a synthetic resin into said first and second cavities to form said housing with said shaft bores and said bosses;

withdrawing said shaft bore forming cores of said first slide dies out of respective shaft bores of said housing, and then, opening said first and second opening-closing dies, with said housing left attached to said first opening-closing die;

closing said first opening-closing die and a third opening-closing die with the former die opposed to the latter die, thereby clamping second opposed slide dies and said peripheral wall of said housing between both said first and third opening-closing dies, while clamping said bosses between boss-corresponding areas of said first recesses of said first opening-closing die and a plurality of second semi-circular recesses opened into a matched surface of said third opening-closing die and opposed to said first recesses, and defining a plurality of opposes third cavities for forming said protruding portions between said protruding portion-corresponding areas of said first and second recesses, defining a plurality of fourth cavities for forming said blade bodies between both said opposed third cavities; and using said shaft bores in said housing as fifth cavities for forming said turnably fitted support shafts and secondarily injecting a synthetic resin into said third, fourth and fifth cavities to form said blades with said protruding portions and said turnably fitted support shafts.

2. A process for two-stage injection molding of an air-conditioning blow-out port device by use of synthetic resin, said blow-out port device comprising:

a housing which includes opposed wall portions and pairs of shaft bores provided in a coaxial arrangement to extend through said opposed wall portions; and a plurality of blades each including a pair of circular-section protruding portions provided at opposite ends of each blade body disposed within said housing to abut against both said opposed wall portions, and a pair of support shafts projectingly provided coaxially on end faces of said protruding portions and turnably fitted in said shaft bores of said housing, respectively; wherein said process comprises the steps of:

closing opposed first and second opening-closing dies to clamp a plurality of first opposed slide dies each including a plurality of shaft bore forming cores between both said first and second opening-closing dies, thereby defining a first cavity for forming said housing so as to include said shaft bore forming cores with their axes aligned with matched surfaces of said opening-closing dies, while fitting a plurality of semi-circular section dammed projections projectingly provided on said matched surface of said second opening-closing die into a plurality of first semi-circular section recesses opened into said matched surface of said first opening-closing die and commonly used for forming halves of said protruding portions;

primarily injecting a synthetic resin into said first cavity to form said housing with said shaft bores;

withdrawing said shaft bore forming cores of said first slide dies out of respective shaft bores, and then, opening said first and second opening-closing dies, with said housing left attached to said first opening-closing die;

closing said first opening-closing die and a third opening-closing die with the former die opposed to the latter die, thereby clamping second opposed slide dies and said housing between both said first and third opening-closing dies, while defining a plurality of opposes second cavities for forming said protruding portions between said first recesses of said first opening-closing die and a plurality of second semi-circular section recesses opened into a matched surface of said third opening-closing die and opposed to said first recesses, and further, defining a plurality of third cavities for forming said blade bodies between said opposed second cavities; and using said shaft bores in said housing as fourth cavities for forming said turnably fitted support shafts and secondarily injecting a synthetic resin into said second, third and fourth cavities to form said blades with said protruding portions and said turnably fitted support shafts.

3. A process for two-stage injection molding of an air-conditioning blow-out port device by use of synthetic resin, said blow-out port device comprising:

a housing which includes a peripheral wall having pairs of shaft bores coaxially arranged in opposed wall portions of said peripheral wall to extend through said opposed wall portions, and pairs of circular section bosses provided in said peripheral wall coaxially with said shaft bores to define openings of said shaft bores at inner surfaces of said opposed wall portions, respectively; and a plurality of blades each including a blade body disposed within said housing with a front edge of said blade body located adjacent a front surface of said housing being formed to have a same radius as a radius of said boss of said housing and with opposite end faces of said blade body abutting against a pair of said bosses, and a pair of support shafts projectingly provided coaxially on said opposite end faces of said blade body and turnably fitted in said shaft bores of said housing, respectively;

wherein said process comprises the steps of:

closing opposed first and second opening-closing dies to clamp a plurality of first opposed slide dies each including a plurality of shaft bore forming cores between both said opening-closing dies, thereby defining a first cavity for forming said peripheral wall of said housing so as to include base ends of said shaft bore forming cores with their axes aligned with matched surfaces of said opening-closing dies, while fitting a plurality of semi-circular section dammed projections projectingly provided on said matched surface of said second opening-closing die into protruding portion-corresponding areas of a plurality of first semi-circular section recesses opened into said matched surface of said first opening-closing die and commonly used for forming halves of adjacent bosses and front edges, thereby defining a plurality of second cavities for forming said bosses around tip ends of said shaft bore forming cores abutting against end faces of said dammed projections by cooperation of boss-corresponding areas of said first recesses with a plurality of semi-circular section recesses opened into said matched surface of said second opening-closing die;

primarily injecting a synthetic resin into said first and second cavities to form said housing with said bosses and said shaft bores;

withdrawing said shaft bore forming cores of said first slide dies out of said respective shaft bores, and then, opening said first and second opening-closing dies, with said housing left attached to said first opening-closing die;

closing said first opening-closing die and a third opening-closing die with the former die opposed to the latter die, thereby clamping second opposed slide dies and said peripheral wall of said housing between both said first and third opening-closing dies, while clamping said bosses between boss-corresponding areas of said first recesses of said first opening-closing die and a plurality of second semi-circular recesses opened into a matched surface of said third opening-closing die and opposed to said first recesses, and defining a plurality of third cavities for forming said blade bodies between opposed bosses; and using said shaft bores in said housing as fourth cavities for forming said turnably fitted support shafts and secondarily injecting a synthetic resin into said third and fourth cavities to form said blades with said turnably fitted support shafts.

* * * * *